(12) United States Patent
Peters (10) Patent No.: US 8,852,070 B2
(45) Date of Patent: Oct. 7, 2014

(54) LOCKING SYSTEM FOR AXIALLY SECURING A ROTOR ONTO A ROTATABLY MOUNTED SHAFT

(71) Applicant: Sigma Laborzentrifugen GmbH, Osterode (DE)

(72) Inventor: Benjamin Peters, Osterode (DE)

(73) Assignee: Sigma Laborzentrifugen GmbH (DE)

( * ) Notice: Subject to any disclaimer, the term of this patent is extended or adjusted under 35 U.S.C. 154(b) by 0 days.

(21) Appl. No.: 13/800,339

(22) Filed: Mar. 13, 2013

(65) Prior Publication Data

US 2013/0188894 A1      Jul. 25, 2013

Related U.S. Application Data

(63) Continuation of application No. PCT/EP2011/004368, filed on Aug. 31, 2011.

(30) Foreign Application Priority Data

Nov. 1, 2010   (DE) .................... 20 2010 014 803 U (51) Int. Cl.
      *B04B 7/06*      (2006.01)
(52) U.S. Cl.
      USPC .............................................. 494/12; 494/16
(58) Field of Classification Search
      USPC ............... 494/12, 16, 20, 33, 38, 64, 84, 85; 210/232
      See application file for complete search history.

(56) References Cited

U.S. PATENT DOCUMENTS

| | | | | |
|---|---|---|---|---|
| 2,329,499 A | * | 9/1943 | Weaver | 57/77 |
| 2,865,662 A | * | 12/1958 | Nurmse | 242/318 |
| 4,193,538 A | * | 3/1980 | Schwarz | 494/16 |
| 4,412,830 A | * | 11/1983 | Strain et al. | 494/12 |
| 4,435,169 A | * | 3/1984 | Romanauskas | 494/20 |
| 4,753,631 A | * | 6/1988 | Romanauskas | 494/9 |
| 5,344,380 A | * | 9/1994 | Chern et al. | 494/12 |

(Continued)

FOREIGN PATENT DOCUMENTS

| | | | |
|---|---|---|---|
| DE | 2722322 A1 | 11/1978 | |
| DE | 19930593 A1 | * 4/2000 | B04B 5/04 |

(Continued)

OTHER PUBLICATIONS

Notification of Transmittal of Translation of the International Preliminary Report on Patentability, dated May 2, 2013.

(Continued)

*Primary Examiner* — Charles Cooley
(74) *Attorney, Agent, or Firm* — Fox Rothschild LLP (57) ABSTRACT

A locking system for axially securing a rotor onto a rotatably mounted shaft. The arrangement includes a plurality of locking levers which are each pivotably mounted about axes extending perpendicularly to the shaft between a locking position and an unlocking position in planes containing the axes. The locking levers can each be automatically transferred between an unlocking position and a locking position depending on rotational speed. The locking levers are mounted on the rotor and an annular groove is provided on the shaft and engages with the locking levers in the locking position, wherein the locking levers are prestressed in the unlocking position. Advantageously, the rotor can be both installed and removed without tools by merely placing the rotor onto or removing the rotor from the shaft, in each case depending on rotational speed.

16 Claims, 6 Drawing Sheets

(56) References Cited

U.S. PATENT DOCUMENTS

| | | | |
|---|---|---|---|
| 5,411,465 A * | 5/1995 | Glen et al. | 494/16 |
| 5,681,257 A * | 10/1997 | Letourneur | 494/12 |
| 5,897,482 A * | 4/1999 | Lowe | 494/12 |
| 6,056,684 A * | 5/2000 | Linder et al. | 494/12 |
| 6,063,018 A * | 5/2000 | Letourneur | 494/12 |
| 6,149,570 A * | 11/2000 | Lowe et al. | 494/12 |
| 6,665,924 B2 * | 12/2003 | Schutz | 29/525.11 |
| 6,764,438 B2 * | 7/2004 | Potter | 494/12 |
| 6,776,751 B2 * | 8/2004 | Potter | 494/12 |
| 6,802,803 B2 * | 10/2004 | Potter | 494/12 |
| 6,981,304 B2 * | 1/2006 | Potter | 29/450 |
| 7,011,618 B2 * | 3/2006 | Potter | 494/12 |
| 7,081,081 B2 * | 7/2006 | Schutz et al. | 494/12 |
| 7,137,198 B2 * | 11/2006 | Potter | 29/889 |
| 7,311,652 B2 * | 12/2007 | Henne | 494/12 |
| 7,419,464 B2 * | 9/2008 | Matusima | 494/84 |
| 7,464,450 B2 * | 12/2008 | Potter | 29/428 |
| 7,837,607 B2 * | 11/2010 | Woodman | 494/12 |
| 8,678,987 B2 * | 3/2014 | Henne | 494/12 |
| 2003/0144124 A1 * | 7/2003 | Schutz | 494/12 |
| 2003/0196310 A1 * | 10/2003 | Potter | 29/428 |
| 2003/0199380 A1 * | 10/2003 | Potter | 494/12 |
| 2003/0199381 A1 * | 10/2003 | Potter | 494/12 |
| 2004/0018928 A1 * | 1/2004 | Schutz et al. | 494/12 |
| 2004/0220037 A1 * | 11/2004 | Potter | 494/12 |
| 2004/0224831 A1 * | 11/2004 | Potter | 494/12 |
| 2004/0229742 A1 * | 11/2004 | Potter | 494/12 |
| 2005/0221971 A1 * | 10/2005 | Potter | 494/37 |
| 2006/0058169 A1 * | 3/2006 | Matusima | 494/84 |
| 2006/0240963 A1 * | 10/2006 | Henne | 494/16 |
| 2008/0146429 A1 * | 6/2008 | Woodman | 494/12 |
| 2011/0212822 A1 * | 9/2011 | Henne | 494/84 |
| 2013/0188894 A1 * | 7/2013 | Peters | 384/91 |

FOREIGN PATENT DOCUMENTS

| | | | |
|---|---|---|---|
| FR | 2951965 A1 * | 5/2011 | |
| JP | 2006272330 A * | 10/2006 | |
| WO | 2010/025922 A1 | 3/2010 | |
| WO | 2011/001729 A1 | 1/2011 | |

OTHER PUBLICATIONS

International Search Report, Intl. Appln. No. PCT/EP2011/004368, dated 14/14/2012, 2 pages. This is the parent of the present application.

* cited by examiner

LOCKING SYSTEM FOR AXIALLY SECURING A ROTOR ONTO A ROTATABLY MOUNTED SHAFT

FIELD OF THE INVENTION

The invention relates to a rotor bearing for a laboratory centrifuge having a rotor which can be placed onto a shaft mounted so as to be able to rotate about an axis and having a locking system intended for axially securing the rotor.

BACKGROUND OF THE INVENTION

The rotor of such a laboratory centrifuge can be placed, within a housing, from above onto the end of a shaft or of an assembly fixedly connected thereto, which assembly is connected to a centrifuge drive. It is provided on the periphery with receivers intended for the insertion of vessels, into which the substances to be treated by centrifugation are received. Considering the high rotational speeds involved and the risk of accidents associated therewith, particular attention must be given to providing a reliable and operationally secure seat for the rotor on the shaft. Risks can arise owing to aerodynamic effects lifting the rotor from the shaft within the centrifuge housing, but also by a lateral impact thereon. Since different rotors are used, they are connected to the shaft in an exchangeable manner, wherein the effort and time required for mounting and removing a rotor can differ according to the constructional design of locking means located between the rotor and the shaft.

From the document WO 2010/025922 A1 a comparable rotor bearing is known in which a sleeve comprising a conical inner profile can be placed onto a vertically extending drive head comprising a complementarily conical outer profile. The drive head is provided with an arrangement of axially parallel pins which, in the placed position, protrude into corresponding apertures in the rotor and are intended to exert an entraining effect about the common axis of the rotor and drive head. The drive head further supports two mutually diametrically opposing coupling elements which can pivot about axes which are in parallel with each other and with the axis of the drive head against the force of a return spring, and which coupling elements lie, when the rotor is stationary, on an annular surface of the said sleeve and even in this position form a means of axially securing the placement position of the rotor. The annular surface is formed in a conical manner and in particular under the proviso that as the rotational speed of the rotor increases the said inner and outer profiles are drawn against each other into increasingly firm contact. Although the rotor can be mounted without the use of tools by mere placement onto the drive head, in order to remove it a pin-like actuating element provided with a push button is required to transfer the coupling elements, which are active even in the stationary condition, into a retracted position in which they no longer lie against the said annular surface. A not inconsiderable construction space is also required to house the coupling elements, their return springs and the actuating element.

SUMMARY OF THE INVENTION

On the basis of this background, the object of the invention is to improve a rotor bearing of the type portrayed in the introduction in a constructionally simple manner including with respect to a simplification of the rotor removal procedure. This object is achieved with such a rotor bearing as described herein.

The invention resides in the fact that both mounting and also removal of the rotor are achieved by placement onto the facing end of the shaft or even of a component firmly connected thereto, and removal therefrom, and in particular without a tool being required or a manually operated switching member integrated into the rotor bearing. A rotor can therefore be exchanged in the quickest and simplest manner, wherein the only perquisite is that the rotor is stationary. For this purpose, a locking system is provided which consists of a plurality of locking levers which can pivot between a locking and an unlocking position in planes which all contain the axes of the rotor and of the shaft. The pivoting movement of the locking levers is initiated automatically and in particular in a rotational speed-dependent manner with the cooperation of centrifugal forces acting on the locking levers.

According to one or more features of at least one embodiment of the invention, the pivoting movement of the locking levers from the locking position into the unlocking position is also initiated automatically in a rotational speed-dependent manner according to centrifugal forces acting on the locking lever.

An automatic rotational speed-dependent execution of a pivoting movement from the unlocking position to the locking position and vice versa can, in the simplest case, be brought about, for example, by a mass distribution of each locking lever relative to its pivot axis such that by reason of gravity the unlocking position is a stable switching position into which the locking lever automatically tips when a defined rotational speed is no longer reached.

According to one or more features of at least one embodiment of the invention, the bearing of the locking levers is preferably arranged on the rotor and they cooperate with an annular groove which is disposed on the shaft or the component firmly connected thereto. The engagement of the locking levers with this annular groove provides an axial means to prevent the rotor being pulled off. The locking levers are provided in the peripheral direction preferably in a uniform distribution, which means that a uniform force transfer from the rotor to the shaft is provided.

As long as sufficient installation space is available, the system of locking levers can also be disposed on a component firmly connected to the shaft and cooperate with an annular groove which can be worked into the inner profile of the rotor.

According to one or more features of at least one embodiment of the invention, an annular spring acting upon all the locking levers is provided, by means of which resilient pretensioning is provided, with which the unlocking position is secured. In this position all locking levers are therefore subject to the same mechanical pretensioning. The annular spring further effects—in a rotational speed-dependent manner— the automatic transfer of all locking levers from the locking position into the unlocking position in which the rotor can easily be pulled axially off the shaft.

One or more features of at least one embodiment of the invention are directed at a variation of a locking lever which can indeed be transferred from the unlocking position into the locking position in a rotational-speed dependent manner with the assistance of centrifugal forces, but wherein the locking position forms one stable switching position by reason of gravity and without the assistance of resilient forces and wherein the unlocking position forms the other stable switching position by reason of resilient force. Such bistable switching behavior of the locking lever can be achieved by a corresponding mass distribution relative to the pivot axis in conjunction with dimensioning and positioning, adapted thereto, of a spring element acting upon the locking lever. During acceleration of the rotor the locking position is adopted by reason of centrifugal force and is retained during braking until the stationary condition. Pivoting into the unlocking position can in this case be brought about merely by pulling off the rotor, whereby an entrainment effect can be exerted on the locking levers and tilt them into the unlocking position.

According to one or more features of at least one embodiment of the invention, each locking lever is mounted in an aperture in the rotor by means of a roller bearing.

According to one or more features of at least one embodiment of the invention, each locking lever is fitted with a control body, the mass of which is determined under the proviso, and is so disposed relative to the axis thereof, that as a result of the centrifugal forces acting thereon a pivoting movement is initiated from the unlocking position secured by resilient pretensioning towards the locking position. The locking lever is for this purpose mounted in the manner of a two-sided lever, wherein the control body is located on one side of the pivot axis thereof, by means of the mass and mass distribution of which control body relative to the pivot axis the rotational speed-dependent pivoting characteristics can be constructionally achieved under consideration of the resilient pretensioning.

One or more features of at least one embodiment of the invention are directed to the further design of the locking lever and of the said annular groove. The annular groove has in each case a portion which is intended for contact on a locking edge of the locking lever, wherein the locking edge is pressed against this portion according to the centrifugal force acting on the control body, thus generating a force, during operation of the laboratory centrifuge, which draws the rotor downwards, i.e. against a contact surface of the shaft or of a component firmly connected thereto.

One or more features of at least one embodiment of the invention are directed at alternative embodiments of the apertures in the locking levers which are intended to receive the annular spring. These apertures should be formed in such a way that easy mounting of the annular spring is possible and furthermore it is ensured that unintentional movement of the annular spring out of these apertures is reliably prevented. For this purpose, the aperture can be provided with an insertion slit, i.e. it can be formed as a profile open in the peripheral direction. In this case, by means of the position and the dimensions of the slit, the annular spring is prevented from leaving the aperture. The aperture can, however, also be formed as a closed profile, which means that a spring present as a linear spring element in the starting condition is threaded into these apertures one after the other, wherein the ends thereof are finally connected to each other to form an annular spring.

It will be recognized that with the present rotor bearing a particularly easy-to-handle operationally-safe embodiment is provided which makes it possible to change a rotor in an extremely short time.

BRIEF DESCRIPTION OF THE DRAWINGS

The invention will be described in more detail hereinunder with reference to the exemplified embodiment illustrated in the drawings in which.

DETAILED DESCRIPTION OF THE INVENTION

Figure 1:
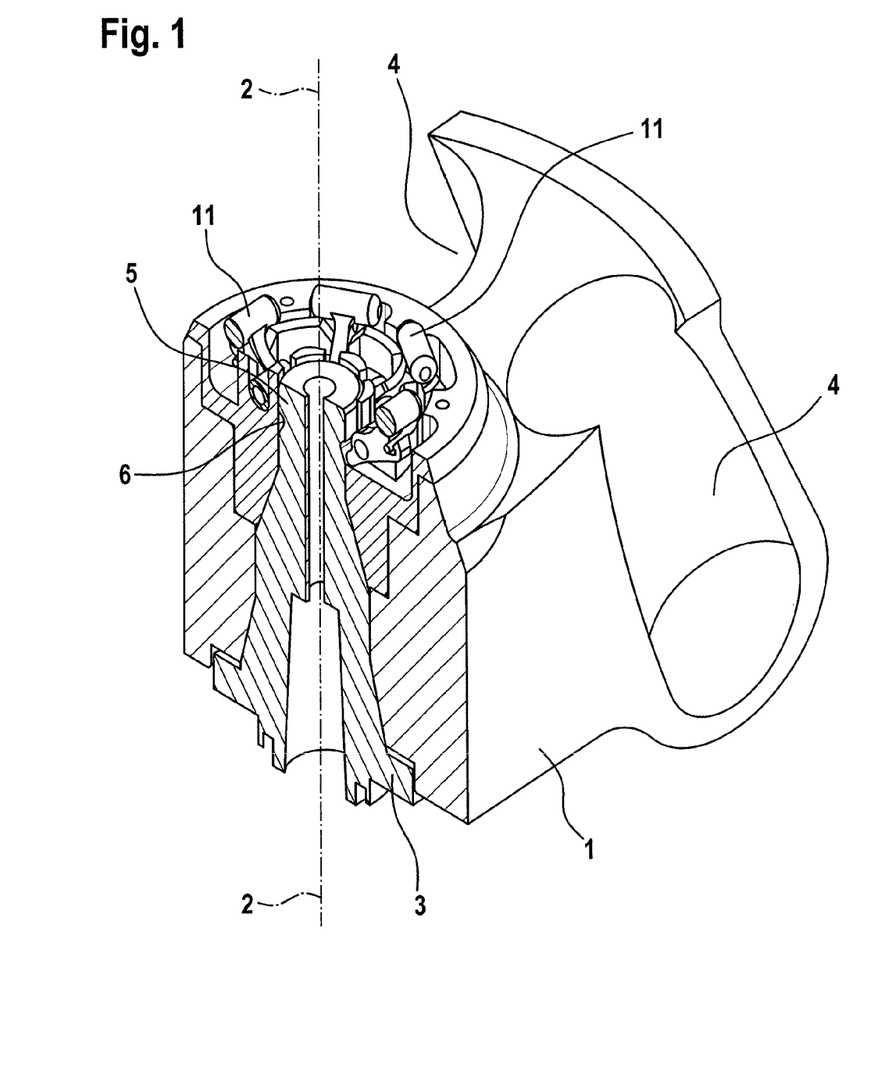
FIG. 1 is a perspective, partial cross-sectional view of a rotor bearing in accordance with the invention.
Figure 2:
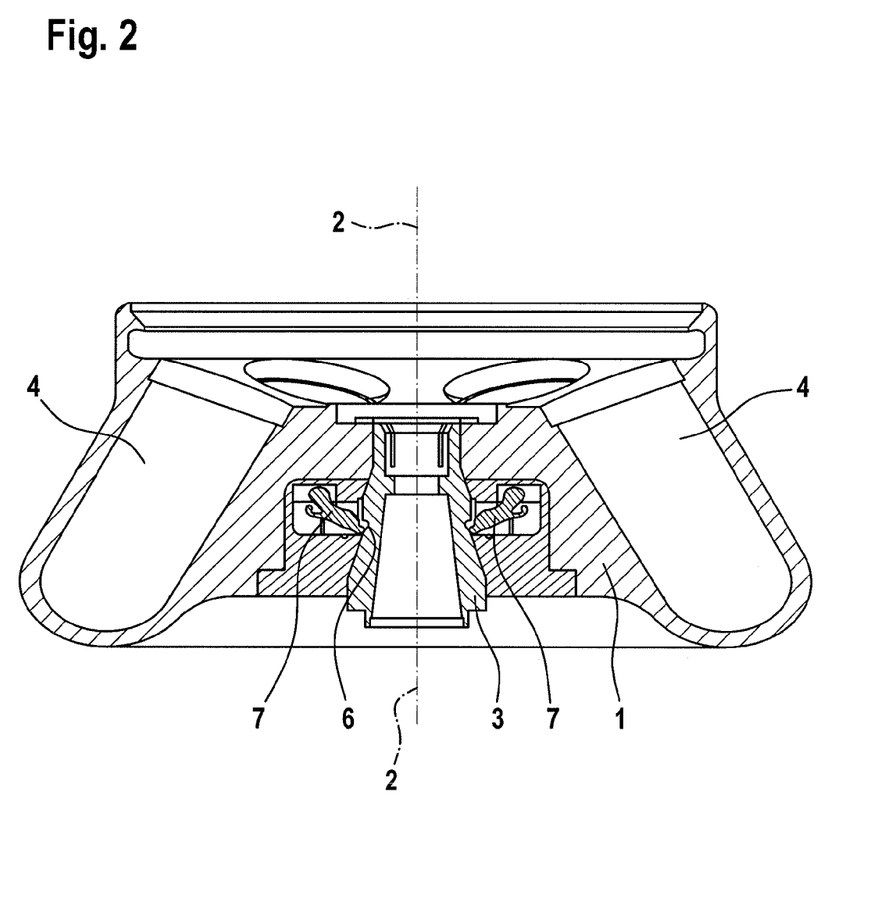
FIG. 2 is a lateral view in a vertical cross-sectional plane of a rotor bearing in accordance with the invention.

FIGS. 1 and 2 each show a rotor 1 of a laboratory centrifuge, which can be placed onto the upper end of a shaft 3 mounted to be able to rotate about an axis 2. The shaft 3 is connected to a drive in a manner not illustrated.

The rotor 1 is provided with apertures 4 in the peripheral region in a manner which is known per se, these apertures extend upwards at an angle in the direction of the axis 2 and are each arranged to receive vessels intended for mixtures of substances to be treated by centrifugation.

On its upper end 5 intended for placement of the rotor 1, the shaft 3 has a plurality of conically widening portions following one another axially from the top to the bottom, wherein the inner profile of the rotor 1 has portions adapted thereto. In particular, the outer profile of the shaft 3 has an annular groove 6 which is arranged for cooperation with a locking system to be described hereinunder and which is intended to secure a firm seat for the rotor 1 in the placement position, and in particular during operation of the laboratory centrifuge.

The locking system consists of an arrangement of locking levers 7 which are each mounted to be able to pivot about axes 8 in apertures 9 in the inner profile of the rotor 1, which extend perpendicular to the axis 2. A plurality of such locking levers 7 are provided in a uniform peripheral distribution, the axes of which all extend in a common plane perpendicular to the axis 2. Accordingly each locking lever 7 is pivotable in a plane in which the axis 2 is also located. In order to achieve a reproducible smooth pivoting movement of the locking levers 7, these are preferably mounted via roller bearings 15 within the apertures 9.

Each locking lever 7 has, on its end facing the shaft 3, a locking edge 10 which, in a manner yet to be described, is arranged and disposed for engagement with the annular groove 6.

Each locking lever 7 has, on its end opposite the locking edge 10, a cylindrical control body 11. Finally, all locking levers 7 are connected via an annular spring 12 which is inserted into the respective aperture 13 in each locking lever 7. The apertures 13 of the locking levers 7 are disposed relative to the axes 8 under the proviso that when the rotor 1 is stationary, a force holding all locking levers 7 in the unlocking position illustrated in FIG. 3, can be exerted on the locking levers 7 via the annular spring 12. This position is characterized in that the locking edges 10 lie against the floor region 14 of the aperture 9, which in this respect fulfils a stop function, and at the same time are pivoted out of a region of engagement with the annular groove 6. This unlocking position is therefore secured by the annular spring 12.

Figure 3:
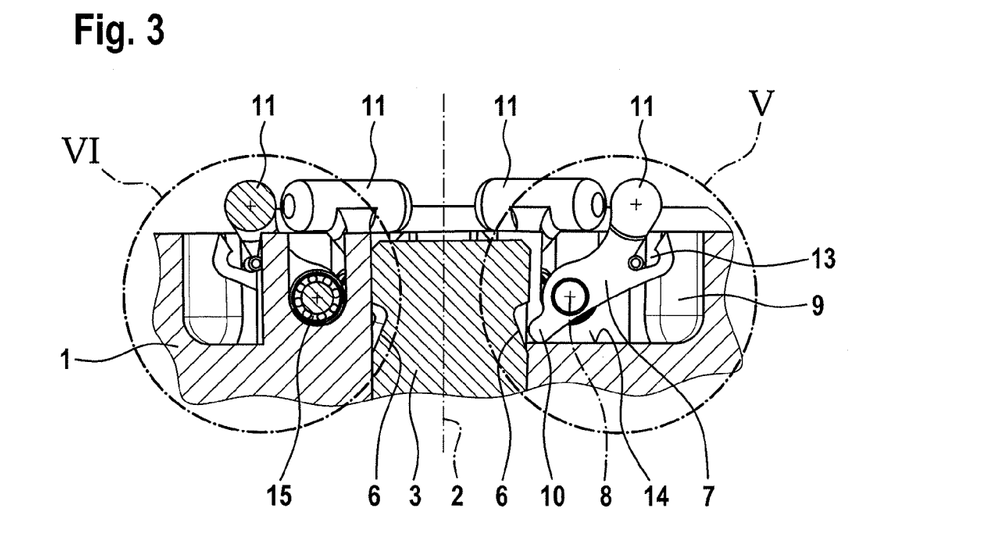
FIG. 3 is a partially enlarged view of the rotor bearing according to FIG. 2 in the unlocking position.
Figure 4:
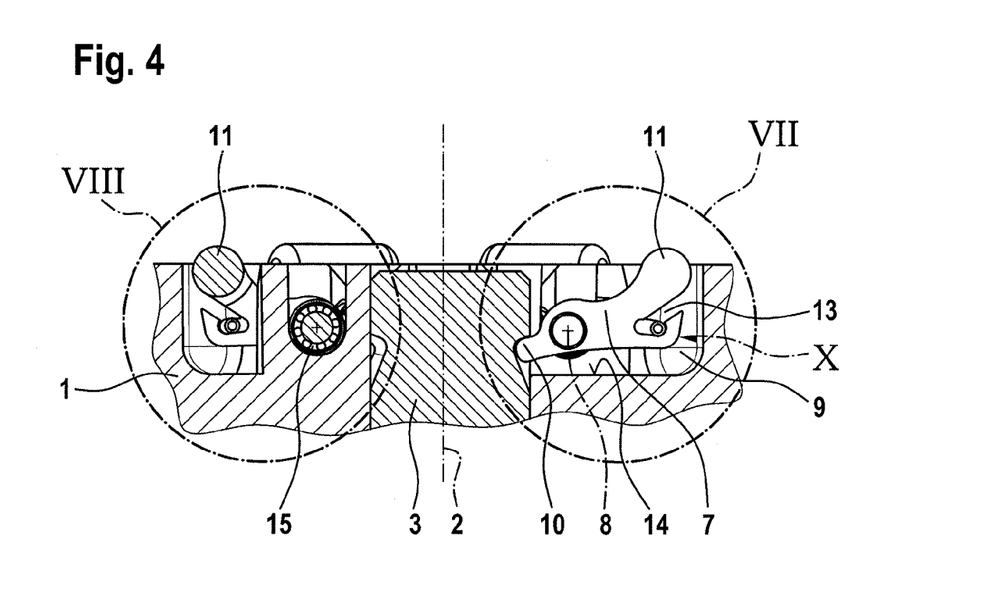
FIG. 4 is a partially enlarged illustration of the rotor bearing according to FIG. 2 in the locking position.

If the rotor 1 is caused to rotate about the axis 2 via the shaft 3, then as a result of the centrifugal forces acting upon all control bodies 11 when a defined rotational speed, constructionally preset by the force of the annular spring 12, is exceeded a deflection of the locking levers 7 about their axes 8 takes place, and in particular from the unlocking position shown in FIG. 3 into the locking position shown in FIG. 4, in which engagement of the locking edge 10 with the annular groove 6 takes place.

In the locking position, which is automatically adopted in a rotational-speed dependent manner, the axial position of the rotor 1 on the shaft 3 is secured in a positive-fitting manner.

As shown in particular in FIGS. 5 to 8, the cross-sectional profile of the annular groove 6 consists of a first lower-side portion 16 which extends upwards and—with respect to the axis of the shaft 3—inwards in an at least approximately rectilinear manner, to which a curved portion 17 is attached which forms a contact edge for the locking edge 10 of the locking lever 7.

Figure 5:
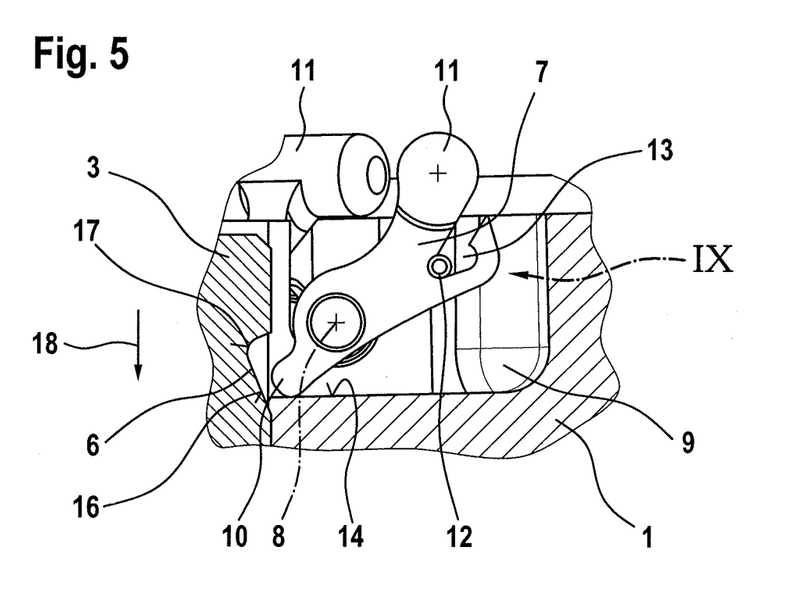
FIG. 5 is an enlarged partial illustration V of FIG. 3.
Figure 6:
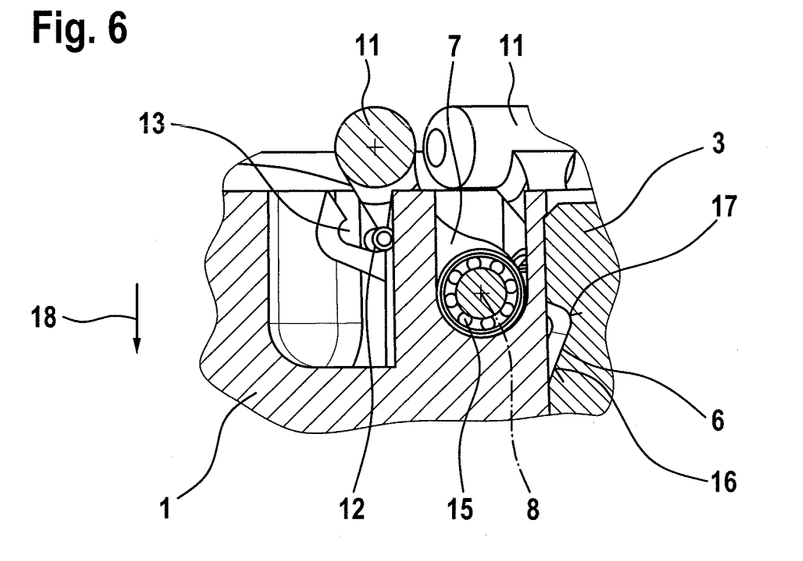
FIG. 6 is an enlarged partial illustration VI of FIG. 3.
Figure 7:
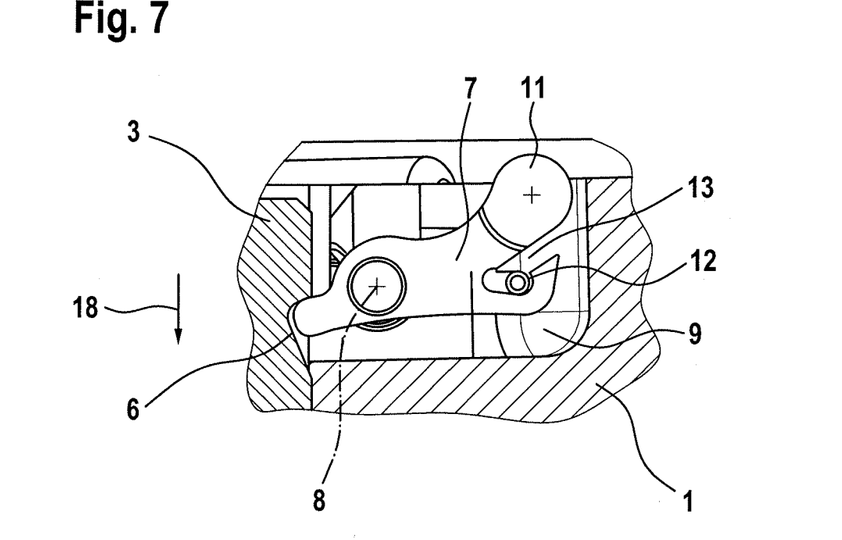
FIG. 7 is an enlarged partial illustration VII of FIG. 4.
Figure 8:
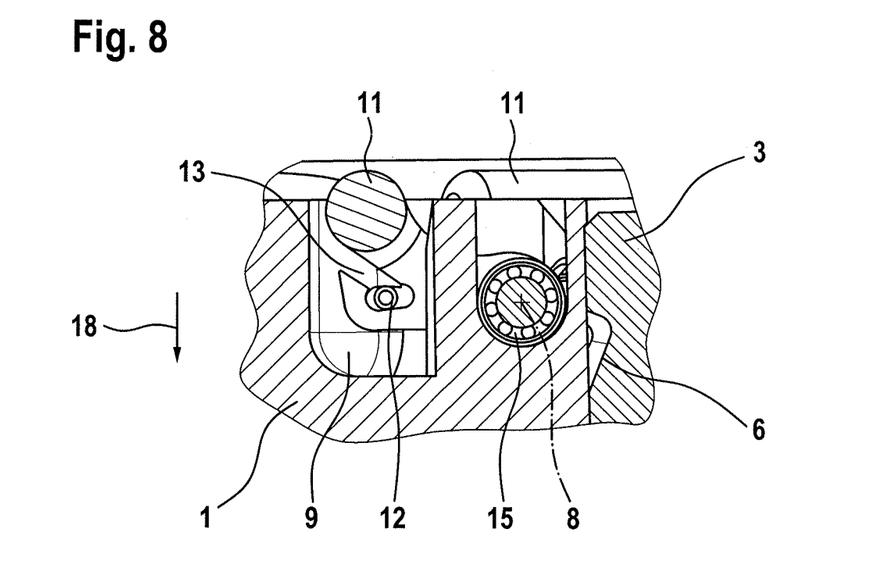
FIG. 8 is an enlarged partial illustration VIII of FIG. 4.

In the operational state of the rotor 1 which, by reason of centrifugal force, effects a rotation of the locking lever 7 from the unlocking position shown in FIG. 5 in the clockwise direction about the axis 8 and in particular to a locking position characterized by the locking edge 10 contacting the portion 17, a force drawing the rotor 1 downwards in the direction of the arrow 18 onto the shaft 3 is produced, which means that the conical inner profile portions of the rotor 1 lie securely in a play-free manner against the complementarily conical outer profile portions of the shaft 3.

Figure 9:
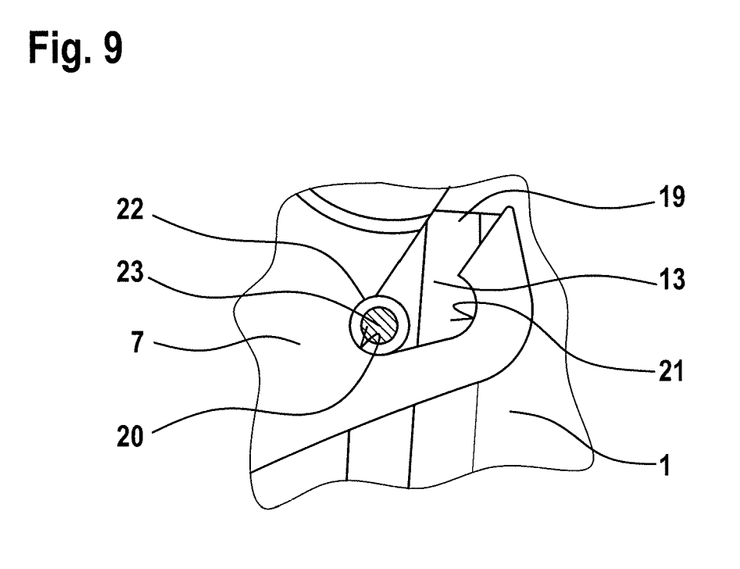
FIG. 9 is a detail IX of FIG. 5.
Figure 10:
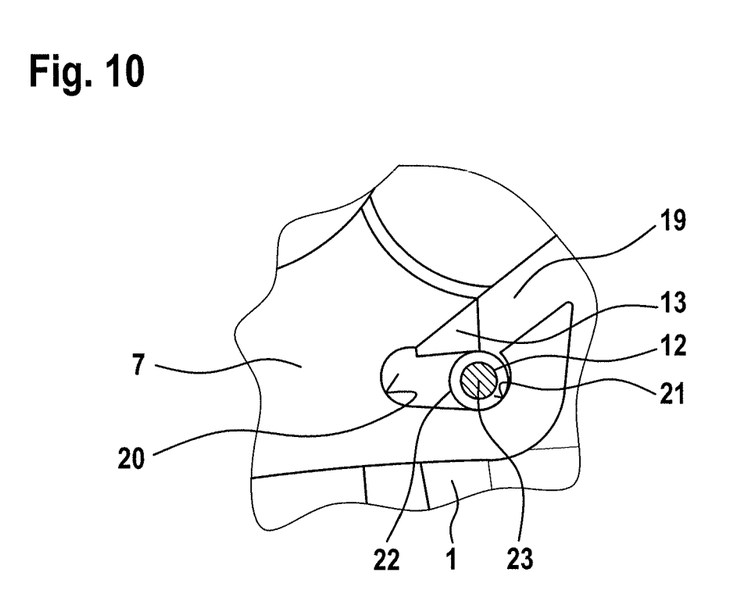
FIG. 10 is a detail X of FIG. 4.

As FIGS. 9, 10 show, the aperture 13 in each locking lever 7 is characterized by an insertion slit 19, via which the annular spring 12 can be inserted into the aperture 13 of each locking lever 7. The annular spring 12 can thus be mounted as an annular structure.

In the unlocking position shown in FIG. 9 the annular spring 12 lies against the radial inner side 20 of the aperture 13 and exerts a force securing the locking lever 7, which lies on the floor region 14 of the aperture 9 in the rotor 1, in this position onto this lever. In the locking position shown in FIG. 10, on the other hand, the annular spring 12 is deflected in the outwards direction until coming into contact with a radial outer side 21 of the aperture 13.

As a result of the insertion slit 19, the cross-sectional profile of the aperture 13 forms at this point in each case a reduction in cross-section which is dimensioned under the proviso that unintentional or accidental exiting of the annular spring 12 from the aperture 13 by reason of centrifugal force is reliably prevented.

In practical terms the annular spring 12 can be designed as a worm spring 22 which on the inside carries a spring wire core 23 for stabilization purposes. A spring of this type can be used as a linear component, the ends of which are connected to each other during mounting in order to form an annular structure. This offers the advantage that instead of the insertion slit 19 only bores or comparable aperture profiles, which are closed on the peripheral side, intended to receive the worm spring 22 are used. Radial exiting of the annular spring 12 by reason of centrifugal force is therefore reliably prevented.

It will be recognized from the statements above that the rotor bearing in accordance with the invention permits axial placement of the rotor 1 onto the shaft 3 from above, wherein positive-fitting securing, in particular locking, automatically occurs as a result of the rotation of the rotor 1, namely owing to the fact that the locking levers 7 come into engagement with the annular groove 6.

The locking state is also released automatically, namely as a result of the return force of the annular spring 12, as soon as a minimum rotational speed is no longer reached, which means that the locking levers 7 are automatically transferred into the unlocking position and the rotor 1 can then be removed.

| Reference list: | |
|---|---|
| 1 | rotor |
| 2 | axis |
| 3 | shaft |
| 4 | aperture |
| 5 | upper end |
| 6 | annular groove |
| 7 | locking lever |
| 8 | axis |
| 9 | aperture |
| 10 | locking edge |
| 11 | control body |
| 12 | annular spring |
| 13 | aperture |
| 14 | floor region |
| 15 | roller bearing |
| 16 | portion |
| 17 | portion |
| 18 | arrow |
| 19 | insertion slit |
| 20 | inner side |
| 21 | outer side |
| 22 | worm spring |
| 23 | spring wire core |

The invention claimed is:

1. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, and wherein the locking levers are mounted on the rotor and an annular groove is disposed on the shaft and is arranged to cooperate with the locking levers in the locking position whereby the locking levers create a force which draws the rotor axially toward the shaft.

2. A rotor bearing as claimed in claim 1, wherein the locking levers can be transferred from the locking position into the unlocking position automatically in a rotational speed-dependent manner.

3. A rotor bearing as claimed in claim 2, wherein the locking levers are under resilient pretensioning in the unlocking position.

4. A rotor bearing as claimed in claim 2, further comprising a control body to create the centrifugal force required to initiate the pivoting movement in the direction of the locking position is disposed on each locking lever.

5. A rotor bearing as claimed in claim 1, wherein the locking levers are under resilient pretensioning in the unlocking position.

6. A rotor bearing as claimed in claim 1, wherein a control body to create the centrifugal force required to initiate the pivoting movement in the direction of the locking position is disposed on each locking lever.

7. A rotor bearing as claimed in claim 1, wherein a locking edge is integrally formed on each locking lever and is in engagement with the annular groove in the locking position.

8. A rotor bearing as claimed claim 1, wherein the annular groove has a rectilinear portion intended for introduction of the facing end of the locking lever and—adjoining this portion—a curved portion intended for contact with the facing end.

9. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, wherein the locking levers are under resilient pretensioning in the unlocking position created by an annular spring which is received in apertures in the locking levers.

10. A rotor bearing as claimed in claim 9, wherein each aperture intended to receive the annular spring has an insertion slit.

11. A rotor bearing as claimed in claim 5, wherein each aperture intended to receive the annular spring has a profile which is closed on the peripheral side.

12. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, and wherein the mass distribution of each locking lever relative to the axis is arranged under the proviso that the locking position is stable by reason of gravity and that the unlocking position can be achieved by axial removal of the rotor from the shaft with application of an entrainment effect on the locking lever.

13. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, and wherein each locking lever is pivotably mounted in an aperture in the rotor by means of a roller bearing.

14. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, wherein the locking levers can be transferred from the locking position into the unlocking position automatically in a rotational speed-dependent manner and are under resilient pretensioning in the unlocking position, and wherein in order to create the resilient pretensioning an annular spring is provided which is received in apertures in the locking levers.

15. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, wherein the locking levers can be transferred from the locking position into the unlocking position automatically in a rotational speed-dependent manner, wherein the locking levers are mounted on the rotor and an annular groove is disposed on the shaft and is arranged to cooperate with the locking levers in the locking position, and wherein the mass distribution of each locking lever relative to the axis is arranged under the proviso that the locking position is stable by reason of gravity and that the unlocking position can be achieved by axial removal of the rotor from the shaft with application of an entrainment effect on the locking lever.

16. A rotor bearing for a laboratory centrifuge, having a rotor which can be placed onto a shaft mounted so as to be able to rotate about an axis, having a locking system intended for axially securing the rotor, wherein the locking system consists of an arrangement of locking levers which are each mounted to be able to pivot about axes extending perpendicular to the axis between a locking position and an unlocking position in planes containing the axis, which locking levers, in the locking position, axially fix the rotor with respect to the shaft and that the locking levers can be transferred automatically and in dependence upon the rotational speed at least from the unlocking position into the locking position, wherein the locking levers can be transferred from the locking position into the unlocking position automatically in a rotational speed-dependent manner, and wherein each locking lever is pivotably mounted in an aperture in the rotor by means of a roller bearing.

* * * * *